J. F. O'CONNOR.
VEHICLE WHEEL.
APPLICATION FILED OCT. 18, 1915.

1,220,535.

Patented Mar. 27, 1917.

WITNESS
Wm. Geiger

INVENTOR.
John F. O'Connor
BY
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

VEHICLE-WHEEL.

1,220,535.  Specification of Letters Patent. Patented Mar. 27, 1917.

Application filed October 18, 1915. Serial No. 56,431.

*To all whom it may concern:*

Be it known that I, JOHN F. O'CONNOR, a citizen of the United States, residing at Chicago, in the county of Cook and State of Illinois, have invented a certain new and useful Improvement in Vehicle-Wheels, of which the following is a full, clear, concise, and exact description, reference being had to the accompanying drawings, forming a part of this specification.

This invention relates to improvements in vehicle wheels.

Heretofore, it has been found that the tires on heavy trucks which necessitate wheels having wide bearings and double tires, wear out very rapidly, due to the fact that in traveling over uneven roadbeds, the load is concentrated on one tire and even on a narrow portion of a single tire, thus subjecting the tires to concentrated loads which soon destroy the efficiency of the same.

The object of my invention is to provide an arrangement more particularly adapted for wheels employed on heavy motor trucks, so arranged that the load will always be borne by both the tires, even though the wheels may be running over an uneven or inclined roadbed.

The invention furthermore consists in improvements in the parts and devices and in the novel combination of the parts and devices herein shown, described or claimed.

Figure 1:
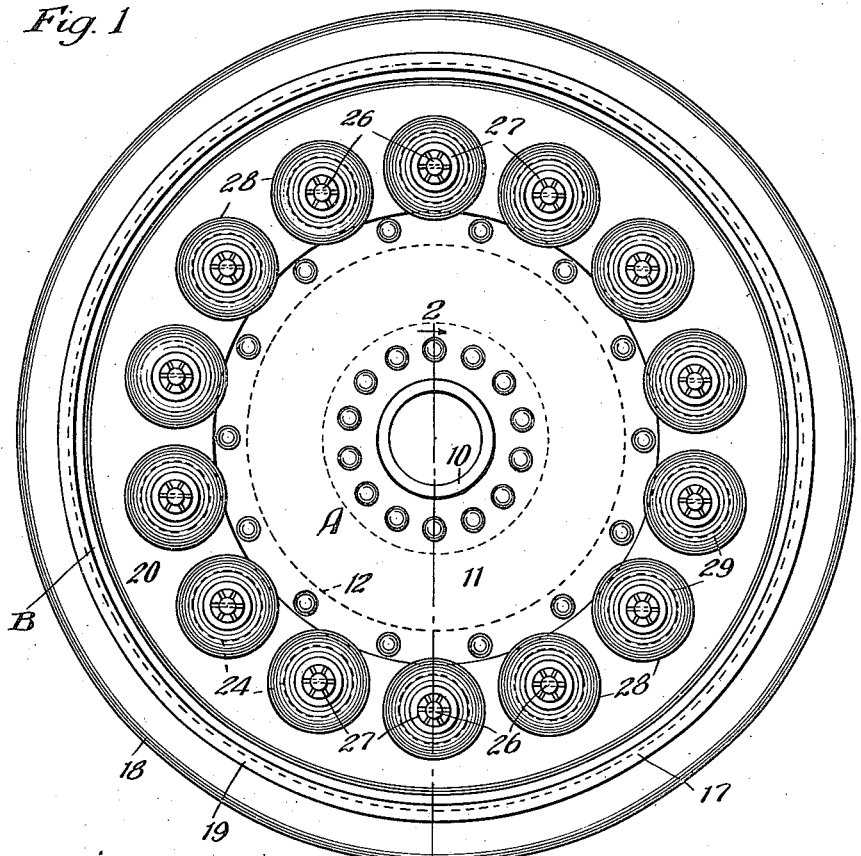
Figure 2:
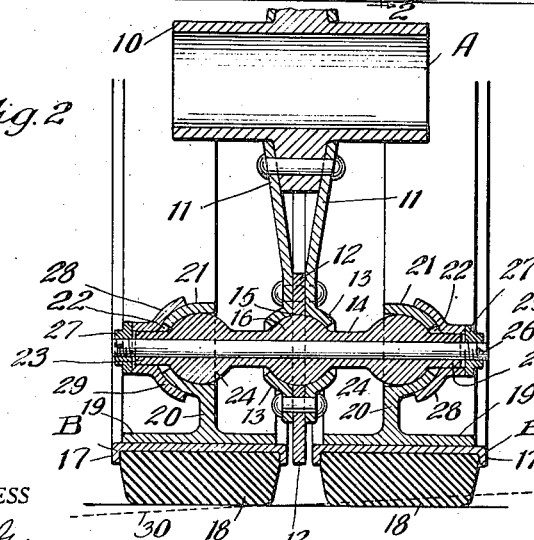
Figure 3:
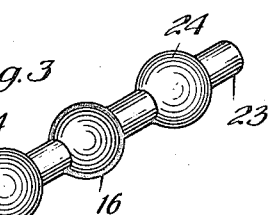

In the drawing forming a part of this specification, Figure 1 is a side elevation of a vehicle wheel showing my improvement in connection therewith. Fig. 2 is a detail, sectional view taken substantially on the line 2—2 of Fig. 1. And Fig. 3 is a detail perspective of one of the bars or levers employed with my arrangement.

In said drawing, A is used to designate a hub member and B—B two separate rim members mounted and arranged as hereinafter described. The hub member A, as shown, consists of a central hub proper 10, to which are secured a pair of heavy disks 11—11, the latter being arranged circumferentially of the hub proper. Each of the disks 11 is shaped as most clearly shown by the section in Fig. 2 and around their periphery, the disks 11—11 have interposed therebetween and riveted thereto an annular disk 12. At intervals around the circumference of the disks 11, the latter are preferably stamped or pressed outwardly as indicated at 13 to form parts of spherical bearings for the bars or levers 14. The stamped or cup shaped portions 13 of the two disks 11 are arranged opposite each other and the annular plate 12 is perforated as indicated at 15 opposite each set of partial bearings 13. Each bar or lever 14, as clearly indicated in Fig. 3, is provided with a centrally located substantially spherical journal 16 which fits between the portions 13 and is adapted for universal movement with respect thereto. Each of the rim members B, as shown, comprises an outer tire or rim proper 17 which has secured thereto a rubber or other suitable tire 18, preferably of solid rubber. The rim or tire plate 17 is secured to a circular, preferably cast, member 19 having an inwardly extending flange 20, the latter being provided around its periphery with a plurality of uniformly spaced cup shaped bearings 21, the latter being perforated as indicated at 22 to permit the ends 23 of the bars or levers 14 to project therethrough and have movement therein. As clearly indicated in Fig. 3, each of the bars or levers 14 is provided near its ends with substantially spherical journals 24—24, the latter being seated in the corresponding cup shaped bearings 21 of the rim members. Each of the bars 14 is provided with a central bore 25 through which is adapted to extend a rod 26 threaded at its ends to receive retaining nuts 27—27. The latter engage and hold in position washers 28—28 having dished or cup shaped portions 29 fitting over the outer sides of the bearings 21.

In assembling the wheel, it will be understood that the bars or rods 14 are interposed between the disks 11 before the latter are riveted together and to the annular plate 12. The rim members B—B may then be applied over the spherical journals 24—24 and retained in position by means of the bolts 26, washers 28 and nuts 27. In operation, when the wheel strikes a portion of the roadbed which is inclined to the axis of the wheel as indicated by the dotted line 30 in Fig. 2, it is apparent that one rim member B will be automatically lowered relatively to the other member B and each of the rim members B will have a full bearing on the roadbed, thus obviating concentration of the load on either tire. The foregoing described relative movement between the rim members B—B, which takes place in parallel planes perpendicular to the axis of the wheel, is possible on account of the universal bearing between each of the bars or levers 14 with the hub member A and universal bearings between the ends of the bars 14 and each rim member. Not only do the treaded surfaces of the wheel accommodate themselves to the irregularities of the roadbed as above described to prevent excessive wear on the rubber tires, but it will also be apparent that shocks are minimized since the lowering or raising of one rim member B relatively to the other a certain amount, will only cause the hub member and thus the axle to be lowered or raised only half of said amount due to the lever arrangement by which the rim members B are pivotally connected to the hub A.

I claim:

1. In a vehicle wheel, the combination with a hub member having a series of substantially spherical sockets around the periphery thereof, of a pair of rim members on opposite sides of said hub member, said rim members having also a corresponding series of substantially spherical sockets, and a corresponding series of levers having each three substantially spherical enlargements coöperable with said sockets of the hub and rim members to thereby provide universal joints between the levers of the hub and rim members.

2. In a vehicle wheel, the combination with a hub member and a pair of rim members, of a series of levers extending through and connected to the hub and rim members, each of said levers having a ball and socket joint with the hub and each of the rim members.

In witness that I claim the foregoing I have hereunto subscribed my name this 14th day of Oct., 1915.

JOHN F. O'CONNOR.